United States Patent [19]
Cox et al.

[11] Patent Number: 5,537,253
[45] Date of Patent: Jul. 16, 1996

[54] HEAD MOUNTED DISPLAY UTILIZING DIFFRACTIVE OPTICAL ELEMENTS

[75] Inventors: J. Allen Cox, Ramsey; Teresa Fritz, Dakota, both of Minn.

[73] Assignee: Honeywell Inc., Minneapolis, Minn.

[21] Appl. No.: 11,582

[22] Filed: Feb. 1, 1993

[51] Int. Cl.$^6$ .................................................. G02B 27/14
[52] U.S. Cl. ............................. 359/630; 359/13; 359/16; 359/637
[58] Field of Search ..................................... 359/566, 569, 359/742, 13, 14, 15, 16, 19, 630, 631, 632, 633, 637

[56] References Cited

U.S. PATENT DOCUMENTS

| | | | |
|---|---|---|---|
| 3,737,212 | 6/1973 | Antonson et al. | 350/174 |
| 4,218,111 | 8/1980 | Withrington et al. | 350/3.72 |
| 4,711,512 | 12/1987 | Upatnieks | 350/3.7 |
| 4,799,765 | 1/1989 | Ferrer | 359/13 |
| 4,859,030 | 8/1989 | Rotier | 350/174 |
| 4,927,234 | 5/1990 | Banbury et al. | 350/174 |
| 5,035,473 | 7/1991 | Kuwayama et al. | 350/3.7 |
| 5,044,706 | 9/1991 | Chen | 359/357 |
| 5,151,823 | 9/1992 | Chen | 359/566 |

FOREIGN PATENT DOCUMENTS

| | | | |
|---|---|---|---|
| 0007039 | 1/1980 | European Pat. Off. | 359/630 |
| 0301473 | 1/1989 | European Pat. Off. | |
| 0305096 | 1/1989 | European Pat. Off. | |

OTHER PUBLICATIONS

"Infrared Applications of Diffractive Optical Elements," Swanson et al., SPIE Proceedings, vol. 885, p. 122, 1988.
"Overview of Diffractive Optics at Honeywell" Author: J. Allen Cox Issued: 1988.
"International Conference on Computer–generated Holography" Author: Sing H. Lee (Aug. 25–26, 1983).
Nordwall, Bruce D., "New Helmet for Pilots to Combine Night Vision and Head–Up Display," *Aviation Week & Space Technology*, Nov. 11, 1991, pp. 78–79.
"Diffractive Optics for Broadband Infrarer Imagers: Design Examples," Proceedings SPIE, vol. 1052 (1989).

*Primary Examiner*—David C. Nelms
*Assistant Examiner*—Son Dinh
*Attorney, Agent, or Firm*—Charles J. Ungemach

[57] ABSTRACT

A head mounted display having an image source, an optical relay system and a combiner for producing an image from the image source to the eye of a pilot in which the optical system includes at least one diffractive surface to compensate for aberrations and distortions in the display.

13 Claims, 3 Drawing Sheets

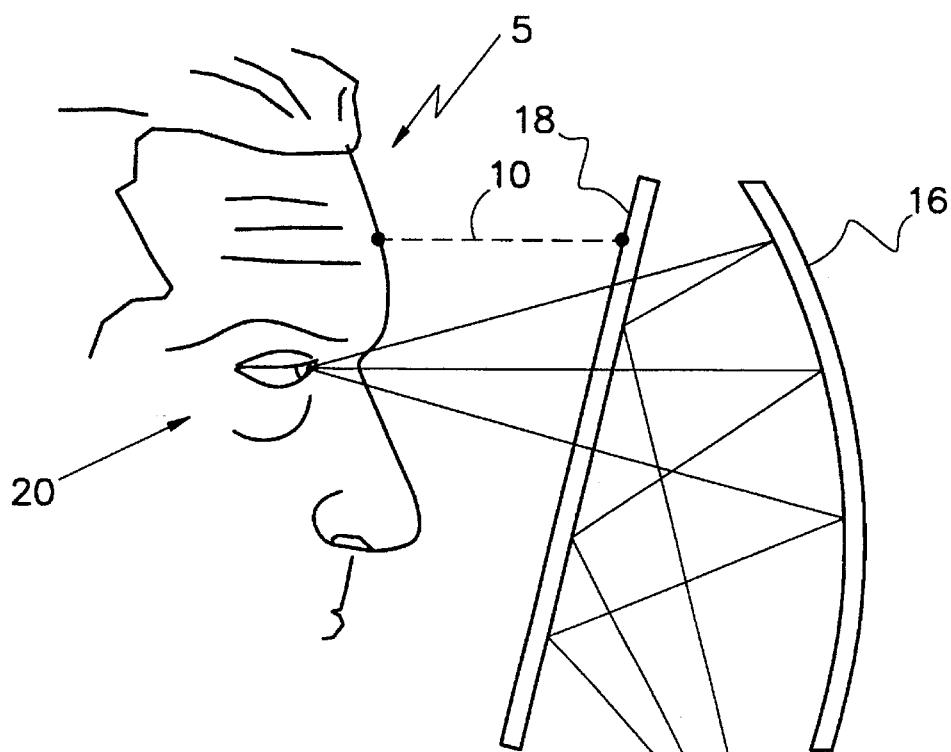
Fig.1
PRIOR ART
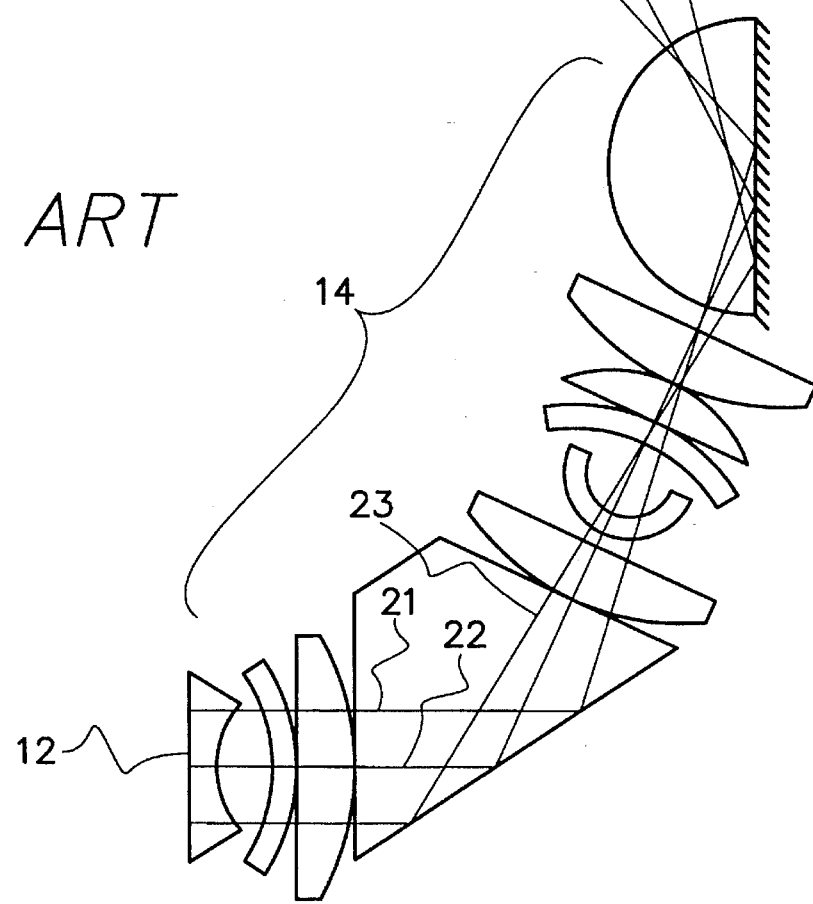

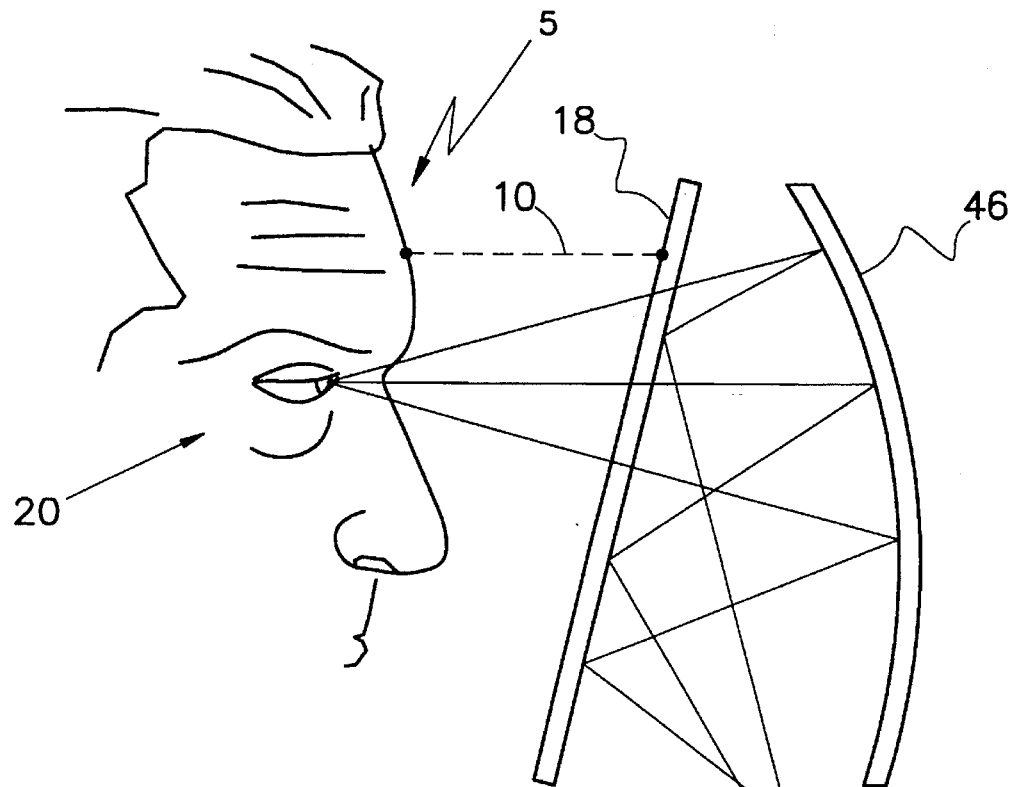
Fig. 3
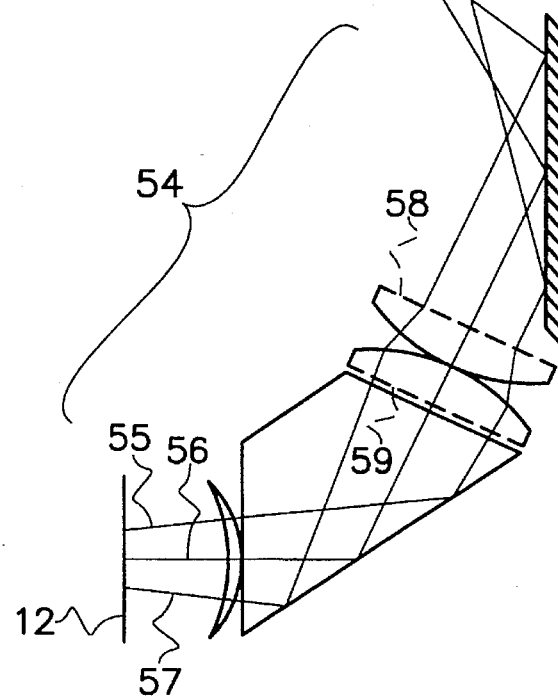

HEAD MOUNTED DISPLAY UTILIZING DIFFRACTIVE OPTICAL ELEMENTS

BACKGROUND OF THE INVENTION

1. Field of the Invention

This invention relates to a display which has a special utility in connection with a head mounted apparatus and more particularly to an attachment for a helmet worn by an aircraft pilot (helmet mounted display) wherein an image of a desired display, such as information on the face of a cathode ray tube, can be introduced into the field of view being observed by the pilot. Specifically, the present invention is an improvement which utilizes one or more diffractive optical surfaces to provide a system which operates with fewer elements and thus simpler, lighter and easier to align and assemble than prior art systems.

2. Description of the Prior Art

A very advantageous head mounted display system is disclosed in U.S. Pat. No. 4,859,030 of Donald J. Rotier and assigned to the assignee of the present invention. This system utilizes a rather complex optical arrangement, usable in a rather restricted space, for directing light from a source, such as a cathode ray tube, to a spherical reflector from which the light is then reflected through a tuned optical filter and, as collimated rays, is directed to the eye of the pilot so that he sees the image at infinity combined with his normal field of view through the optical filter and spherical combiner. In order to make a compact display system with high efficient, it is necessary to tilt it so that the center of curvature is not at the pilots eye since if it were, the light from the CRT would have to strike the combiner perpendicular so as to be reflected to the eye along the same path. This then would result in a reduction of light from the CRT to one quarter of its intensity and would also reduce the light from the surrounding scene by fifty percent. This was solved in the above mentioned Rotier patent by tilting the combiner so that the rays from the filter to the combiner were not reflected back to the filter along the same path and by utilizing special coatings on the filter so that the amount of light lost on reflection at predetermined angles (those from the CRT) was very small but the amount of light transmitted by the filter at certain angles (those from the combiner) was very large. Tilting of the spherical combiner did, however, introduce additional aberrations, a tilt distortion, and a mapping distortion such as the "Keystone" effect which had to be corrected in the Rotier apparatus with additional optical elements and off-center components to provide a distortion free view for the pilot.

While the Rotier system is quite satisfactory for performing all of the desired functions, the number of components and their off-center arrangement has made the system difficult to assemble and align and it is heavier and more costly to produce than desirable.

SUMMARY OF THE INVENTION

The present invention overcomes the problems with the prior art head mounted display by utilizing one or more diffractive surfaces in the optical system. These diffractive surfaces are shaped by known techniques to correct not only for chromatic and aspheric aberration, but also to produce the necessary tilt and decenter functions for aberration correction and distortion mapping correction, and thus may be substituted for several optical elements of the Rotier apparatus and thus reduce the number of optical elements and eliminate off-center lenses therein. The diffractive surfaces are preferably formed on existing surfaces of the system so as to further prevent an increase the number of components.

The hybrid system of the present invention contains only simple spherical lenses that are fewer in number and with a spherical combiner, involve no off-axis components and yet which provides all the same corrections as in the prior art. When used with a spherical combiner, and with two diffractive surfaces, the number of lenses can be reduced from eight, some of which are non-spherical and/or non-centered, as seen in the above mentioned Rotier Patent, to seven centered spherical lenses, thus making alignment and assembly of the system much easier. Further reductions in number of components is obtainable by using a non-spherical (e.g. elliptical) combiner which suffers no astigmatism from the combiner and only four lenses are then needed but, although none of the lenses are aspheric, two of the lenses are now decentered.

Use of diffractive surfaces in optical systems is known in the prior art. For example, "Head Up Displays" have employed diffractive elements, usually in combination with the combiner therein so as to act as an optical filter and/or focussing and collimating means. Diffractive surfaces have also been used in telescopes to correct for chromatic and spherical aberrations but neither head up displays nor telescope systems require the very close tolerances and small available space encountered in head mounted systems and the design concepts cannot normally be interchanged. Furthermore, there has heretofore been no optical systems which have employed diffractive surfaces to remove tilted and decentered optical elements or to correct for distortion mapping such as the Keystone effect.

A more complete understanding of the invention will be obtained upon an examination of the following specification and claims read in connection with the attached drawings.

BRIEF DESCRIPTION OF THE DRAWINGS

FIG. 1 shows a system utilized in the prior art;

FIG. 3 shows the apparatus of the present invention utilizing an elliptical combiner.

DESCRIPTION OF THE PREFERRED EMBODIMENTS

Figure 2:
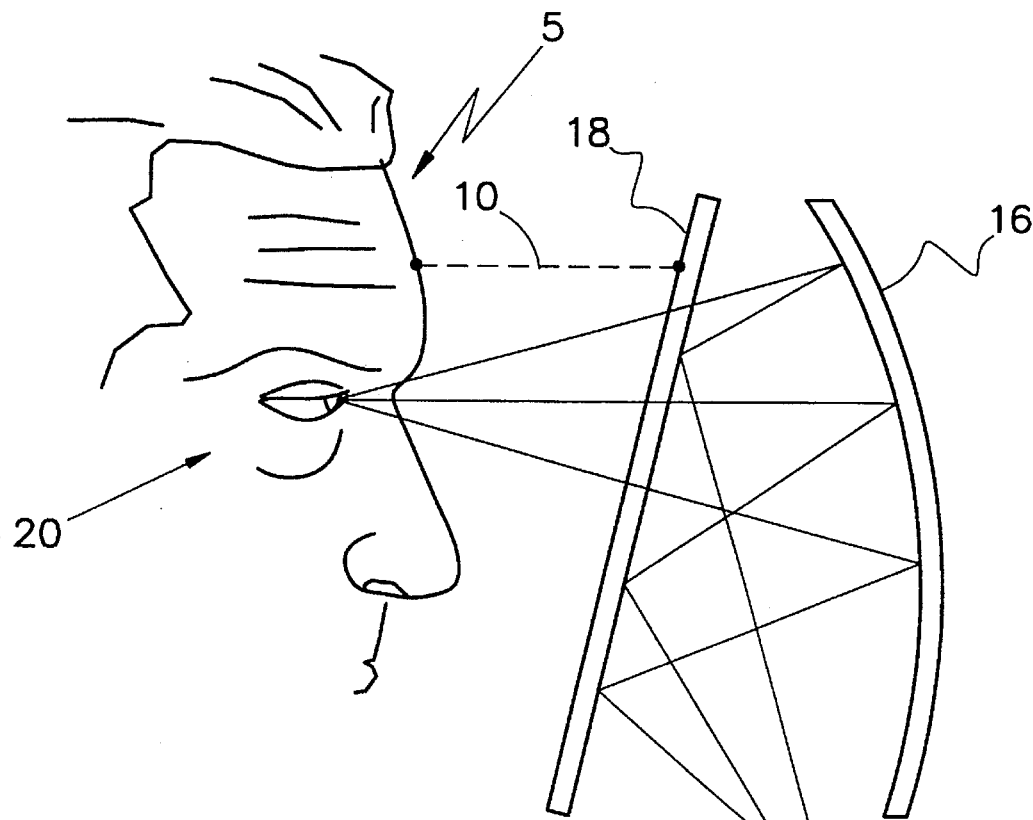
FIG. 2 shows the present invention utilizing a spherical combiner.
Figure 2:
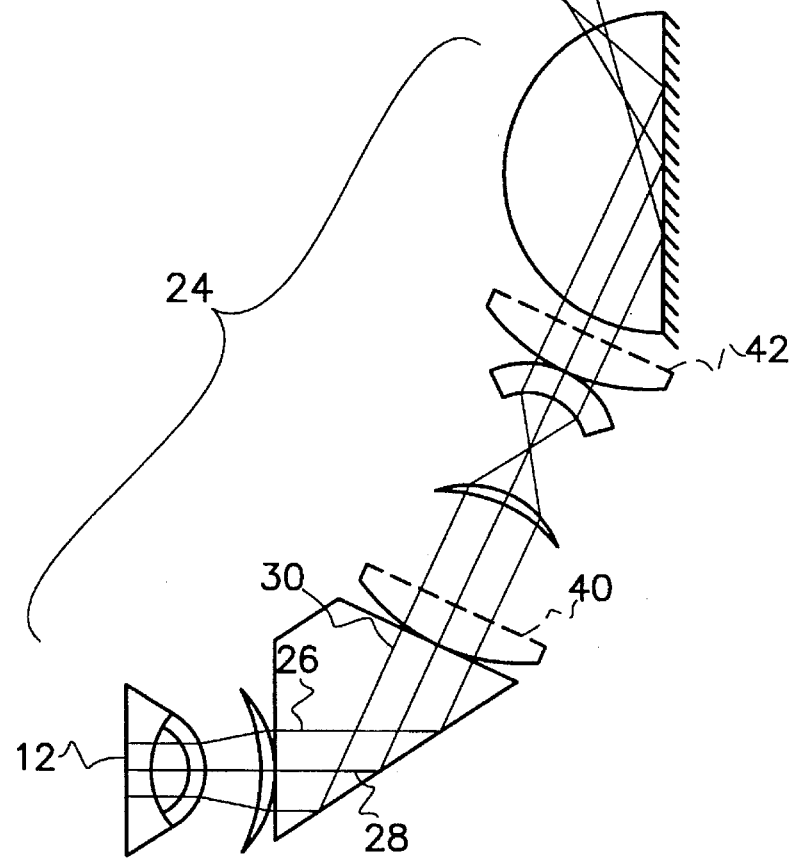

The helmet mounted display of FIG. 1 is like that shown in the above-referred to Rotier Patent 4,859,030. In this system, the apparatus is mounted to the head 5 of an observer by a connection shown as dashed line 10 which represents the helmet mounting shown in FIG. 1 of the Rotier Patent, and an image from a cathode ray tube surface 12 passes through an optical relay system 14 to a spherical combiner surface 16. More particularly, light rays from the optical relay system 14 is reflected from a tuned filter 18, which may be like that of the Rotier patent, and then to the combiner 16 for reflection back through the filter 18 and are focused on the eye of a pilot 20. For simplicity, the light rays are shown as three principal rays 21, 22 and 23 passing through the system. The rays 21, 23 and 23 emerge from the filter 18 as collimated wavefronts to produce an image of the CRT surface 12 at infinity so as to superimpose this image with the image of the surrounding scene being viewed by the pilot 20 through the combiner 16 and the filter 18.

It is seen in FIG. 1 that the combiner 16 is tilted so that the optical axis of the eye and combiner are not colinear which allows the rays 21, 22 and 23 coming from the relay optics 14 to reflect off of filter 18 at different angles of incidence than the rays from combiner 16 and allow greater amounts of light for both the CRT image and the scene image by tuning the filter 18 as described in the Rotier patent. As explained, however, this produces tilt errors, decentering and distortion mapping which must be corrected. Accordingly, the optical relay system 14 consists of ten optical elements, eight of which are lenses and that several of these lenses are non-spherical and/or off-centered. Each of the lenses and combinations of lenses performs a function such as correcting for chromatic operation, correcting for aspheric aberration, producing the required tilt and decentering corrections, and for correcting distortion mapping. It is also seen that the number of elements produces a rather complex system which, it has been found, is difficult to assemble and align, and adds greatly to the weight and cost of the helmet mounted display.

FIG. 2 shows the present invention utilizing a simplified optical relay system 24 in combination with the spherical combiner 16 and the filter 18 to focus an image from the surface 12 of the CRT on the eye of the pilot 20 as was the case in FIG. 1. Again in FIG. 2, only three principal light rays 26, 28, and 30 are shown. Since the combiner 16 is spherical, it must be tilted and the rays 26, 28 and 30 passing from the cathode ray tube 12 to the eye of pilot 20 must be corrected for chromatic aberrations, spherical aberration, decentering, distortion mapping and tilt correction. Accordingly, in the present invention, diffraction surfaces shown as dashed lines 40 and 42 are introduced on two surfaces which for example may be the planar surfaces of two of the presently existing lenses. Diffraction surfaces 40 and 42 may be made by Binary Optic Microlithography, by diamond turning or any other suitable method and are shaped to counter balance the effects of the aberrations and errors. The image formed is, like that of FIG. 1, at infinity so that the pilot observes the image along with the image of the scene he sees through the filter 18 and spherical combiner 16. It is seen that the optical system of FIG. 2 has reduced the number of optical elements involved to nine, only seven of which are lenses and all of which are spherical and coaxial. This has been made possible by utilizing the two diffractive surfaces 40 and 42 which perform the same function and replace several of the lenses of FIG. 1.

FIG. 3 shows a yet simpler system utilizing an elliptical combiner 46, which is somewhat more difficult to fabricate than a spherical combiner. In FIG. 3, the optical system 54 transmits an image from the surface of cathode ray tube 12 along paths such as shown by reference numerals 55, 56 and 57 through three spherical lenses, one prism and one reflecting surface to the filter 18 and then to the eliptical combiner 46 for reflection back through the filter 18 to the eye of pilot 20. In FIG. 3, two diffractive surfaces shown as dashed lines 58 and 59 are again used with each being formed on one surface of already existing lens within optical system 54. The diffractive surfaces 58 and 59 are again formed to correct for the aberrations and for the tilt, decentering and mapping distortions as was the case in FIG. 2.

As before, three principal light rays 55, 56 and 57 are shown passing from the cathode ray tube surface 12 through the optical system 54 to be reflected from the filter 18 to the elliptical combiner 46 and then back through the filter 18 to be focused on the eye of the pilot 20 as an image at infinity so as to be combined with the view seen by the pilot through the filter 18 and combiner 46.

With an elliptical combiner the on-axis field point suffers no astigmatism from the combiner. Because the elliptical combiner can have the eye of the pilot 20 at one of the ellipse's focii, the astigmatism caused by tilting the combiner is substantially eliminated thus reducing the number of optical components even without the diffraction surfaces. With the diffraction surfaces 58 and 59, the system is simplified further to one having only three lenses all of which are spherical and centered. Thus the system of FIG. 3 although involving a more difficult combiner to fabricate, yields a great weight reduction and, in addition, provides a better performance, a larger exit pupil, and is a very simple centered optical train compared to the conventional design of the prior art.

It is thus seen that we have provided an improved helmet mounted display which is at least as satisfactory as the prior art in performance and yet provides the performance with reduced number of optical elements to save on weight, alignment and cost.

Many changes and alterations will occur to those skilled in the art. For example, while two diffractive surfaces have been shown in connection with the preferred embodiments, one such surface may be satisfactory in some cases and three or more surfaces may be used to further refine the optics. Also, although shown in connection with the helmet mounted display of the Rotier patent, it may also find utility in other head mounted displays such as goggles. Accordingly, I do not wish to be limited to the disclosures used in connection with the preferred embodiments but intend only to be limited by the following claims.

The embodiments of the invention in which an exclusive property or right is claimed defined as follows:

1. A head mounted display comprising:

an image source;

an image combiner;

a relay optical system for transmitting the image from the source to the combiner, said relay optical system including diffractive optical means for correcting aberrations and;

means mounting the image source, the image combiner and the relay optical system to the head of an observer.

2. Apparatus according to claim 1 wherein the image combiner is spherical and tilted, thus introducing tilt errors, and the diffractive optical means is shaped to correct for the tilt errors.

3. Apparatus according to claim 2 wherein the tilt of the image combiner also introduces distortion mapping errors and the diffractive optical means is shaped to also correct for the distortion mapping errors.

4. Apparatus according to claim 3 wherein the image combiner is partly transparent and the viewer sees the surrounding scene therethrough combined with the image from the image source.

5. Apparatus according to claim 4 wherein the diffractive optical means includes a diffraction structure formed on an already existing surface in the relay optics.

6. Apparatus according to claim 4 wherein the diffractive optical means includes two diffraction structures formed on two already existing surfaces in the relay optics.

7. Apparatus according to claim 1 wherein the image combiner is elliptical.

8. Apparatus according to claim 7 wherein the diffraction optical means is shaped to correct for aberrations and distortions in the image viewed by the observer.

9. Apparatus according to claim 8 wherein the diffractive optical means includes a diffraction structure formed on an already existing surface in the relay optics.

10. Apparatus according to claim 8 wherein the diffractive optical means includes two diffraction structures formed on two already existing surfaces in the relay optics.

11. The method of correcting for tilt error in a head mounted optical imaging system containing an optical combiner and plurality of optical components in a relay, comprising the steps of:
 1) forming a diffraction grating on one surface of one of the optical components; and,
 2) shaping the grating to compensate for the tilt error.

12. The method of claim 11 where the system contains both tilt and distortion mapping errors and Step 2) includes shaping the grating to also compensate for the distortion mapping error.

13. Apparatus according to claim 1 wherein the aberrations may include one or more of chromatic aberration, spherical aberration, decentering, distortion mapping and tilt correction.

\* \* \* \* \*